US005966176A

United States Patent [19]

Chow et al.

[11] Patent Number: 5,966,176

[45] Date of Patent: Oct. 12, 1999

[54] CAMERA HOUSING

[75] Inventors: Cary Robert Chow; Juan Pablo Cilia, both of Los Angeles; Christopher Warren Glupker, Van Nuys; Donald Joseph Huntting, Moorpark; Lance Gordon Hussey, Sherman Oaks; Ravi Kumar Sawhney, Calabasas; John Frank Zinni, Capistrano Beach, all of Calif.

[73] Assignee: Zero Corporation, Los Angeles, Calif.

[21] Appl. No.: 08/861,490

[22] Filed: May 22, 1997

[51] Int. Cl.[6] ........................ H04N 5/225; H04N 7/18; H04N 9/47

[52] U.S. Cl. ........................ 348/373; 348/143

[58] Field of Search ........................ 348/373–376, 348/143; 396/12, 427, 428; 352/34; 248/229.16, 229.26, 316.7, 223.41; H04N 5/225

[56] References Cited

U.S. PATENT DOCUMENTS

| | | | |
|---|---|---|---|
| 5,224,675 | 7/1993 | Ellenberg | 396/427 |
| 5,563,659 | 10/1996 | Bernhardt | 348/373 |

FOREIGN PATENT DOCUMENTS

| | | | |
|---|---|---|---|
| 5183783 | 12/1991 | Japan | H04N 5/225 |
| 5183787 | 12/1991 | Japan | H04N 5/225 |

*Primary Examiner*—Wendy Garber
*Assistant Examiner*—Alicia M. Harrington
*Attorney, Agent, or Firm*—Quarles & Brady

[57] ABSTRACT

A camera housing of generally rectangular shape with sides and ends and having a housing bottom and a housing top, with the top hinged to the bottom along one of the sides of the housing for pivoting between a housing open position for installing and removing a camera, and a housing closed position for holding the camera in place in the housing, and a camera clamp for attaching to the camera, with the clamp having a body for overlying the camera and opposed wings projecting laterally from the camera, with each of the wings having outwardly projecting fingers with spaces therebetween, and with the housing bottom having opposing side walls defining a camera receiving section, each of the walls having laterally inwardly projecting fingers with spaces therebetween for engaging the camera clamp outwardly projecting fingers for positioning the camera clamp and camera in the housing.

9 Claims, 3 Drawing Sheets

CAMERA HOUSING

BACKGROUND OF THE INVENTION

This invention relates to camera housings and in particular to a new and improved camera housing suitable for use with various security cameras now widely used for monitoring activities in various areas, both indoors and out.

Security cameras are used in many situations, indoors and out, stationary and moving, and usually are positioned above the people, vehicles and other moving items which can obstruct the camera view. The security cameras normally are mounted out of the reach of those passing by, but at the same time normally are exposed to view and need to be accessible for maintenance and the like.

Problems presently encountered with security camera installations include the fact that the cameras themselves and the housings in which they are supplied often are not attractive nor durable, and often do not provide protection from the elements. Also, the cameras on the market come in various sizes and shapes with a variety of mounting arrangements causing extra work in installing and removing a camera.

Accordingly, it is an object of the present invention to provide a new and improved camera housing which can be permanently installed in the desired observation location, and which will receive and support cameras of various shapes and sizes, and which will permit installation and removal of the camera with a minimum of effort and without removing the housing.

Other objects, advantages, features and results will more fully appear in the course of the following description.

SUMMARY OF THE INVENTION

The invention preferably includes a camera housing of generally rectangular shape with sides and ends and having a housing bottom and a housing top, with the top hinged to the bottom along one of the sides for pivoting between a housing open position for installing and removing a camera, and a housing closed position for holding the camera in place in the housing. The invention further includes a camera clamp for attaching to the camera, the clamp having a body for overlying the camera and opposed wings projecting laterally from the camera, each of the wings having outwardly projecting fingers with spaces therebetween, with the housing bottom having opposing side walls defining a camera receiving section, each of the walls having laterally inwardly projecting fingers with spaces therebetween for engaging the camera clamp outwardly projecting fingers for positioning the camera clamp and camera in the housing.

Preferably the camera housing is a single molded unit and has opposing side walls in the top with inner side ribs parallel to the housing top side walls and positioned to overly the housing bottom inwardly projecting fingers and spaces when the housing top is in the housing closed position.

Also preferably in the housing of the invention the housing bottom has an inner bottom surface and an outer bottom surface, with a stiffener plate positioned on the inner bottom surface and a mounting bracket positioned on the outer bottom surface, with the stiffener plate and mounting bracket joined together through the housing bottom. Also the preferred form of the invention includes a fan unit, a heater unit, and a control unit for the fan unit and heater unit mounted in the housing bottom.

DESCRIPTION OF THE PREFERRED EMBODIMENT

Figure 1:
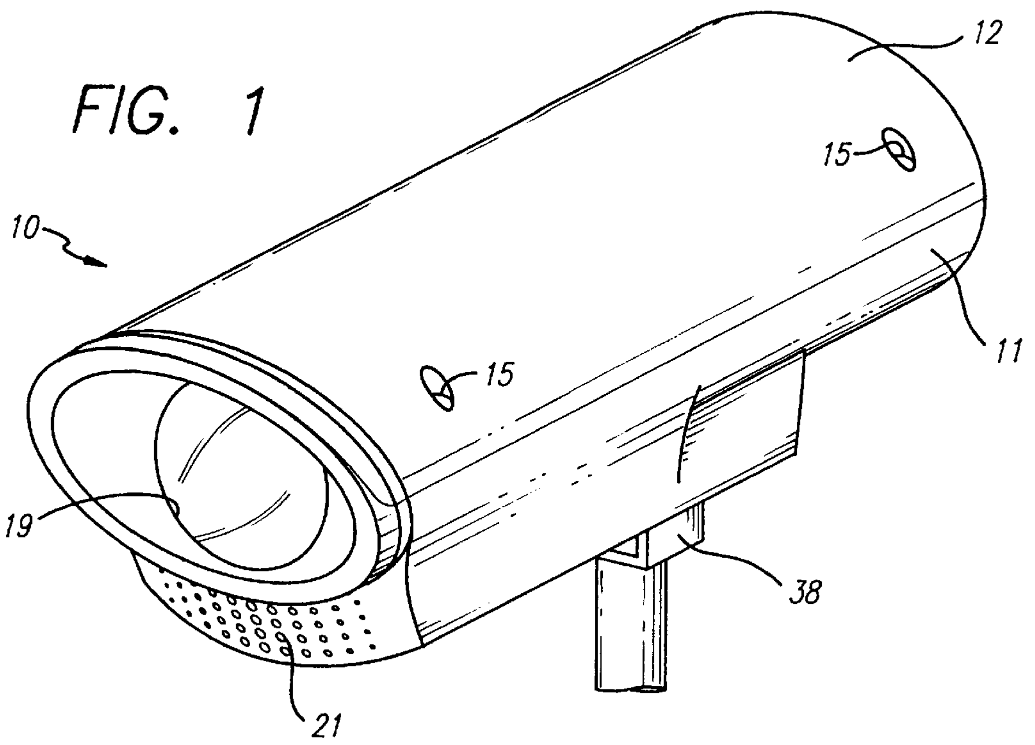
FIG. 1 is a perspective view of a camera housing in the closed position and incorporating the presently preferred embodiment of the invention.
Figure 3:
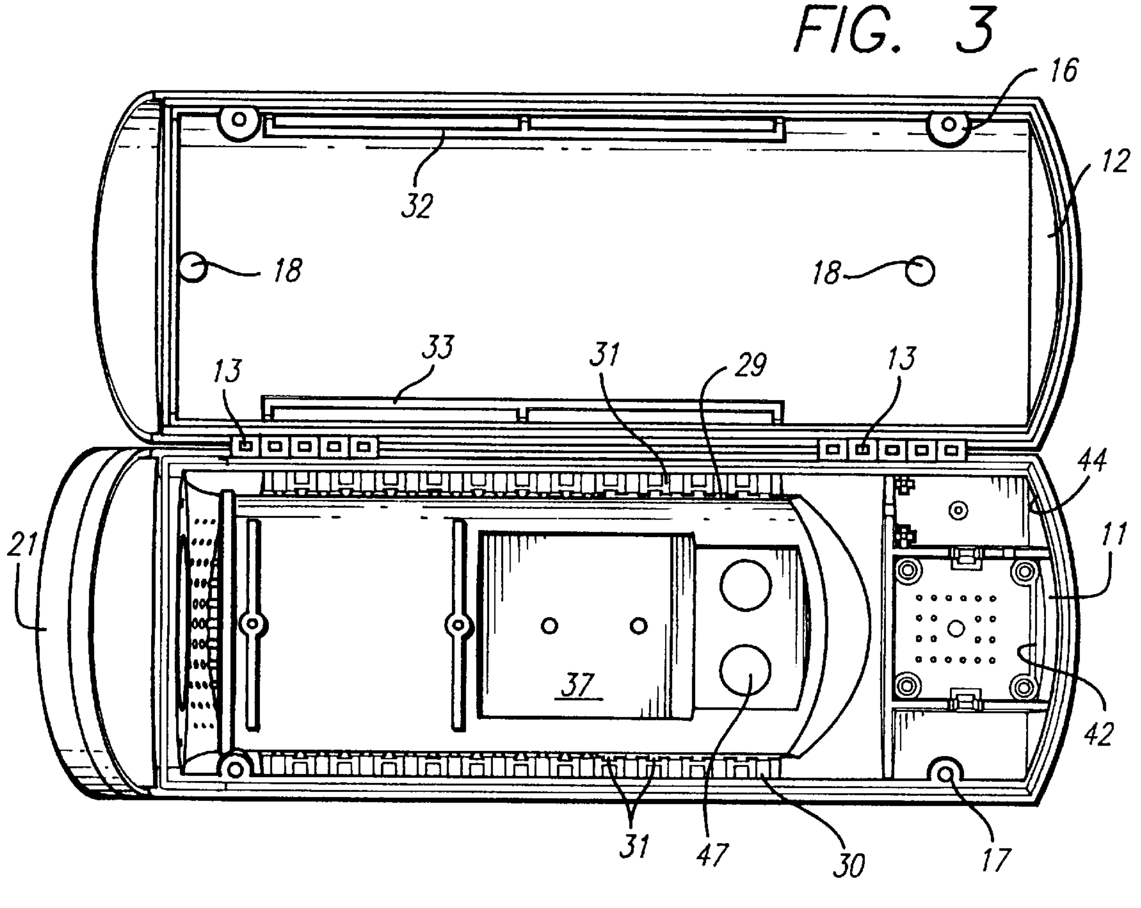
FIG. 3 is a top view of the camera housing of FIG. 1, in the open position.
Figure 2:
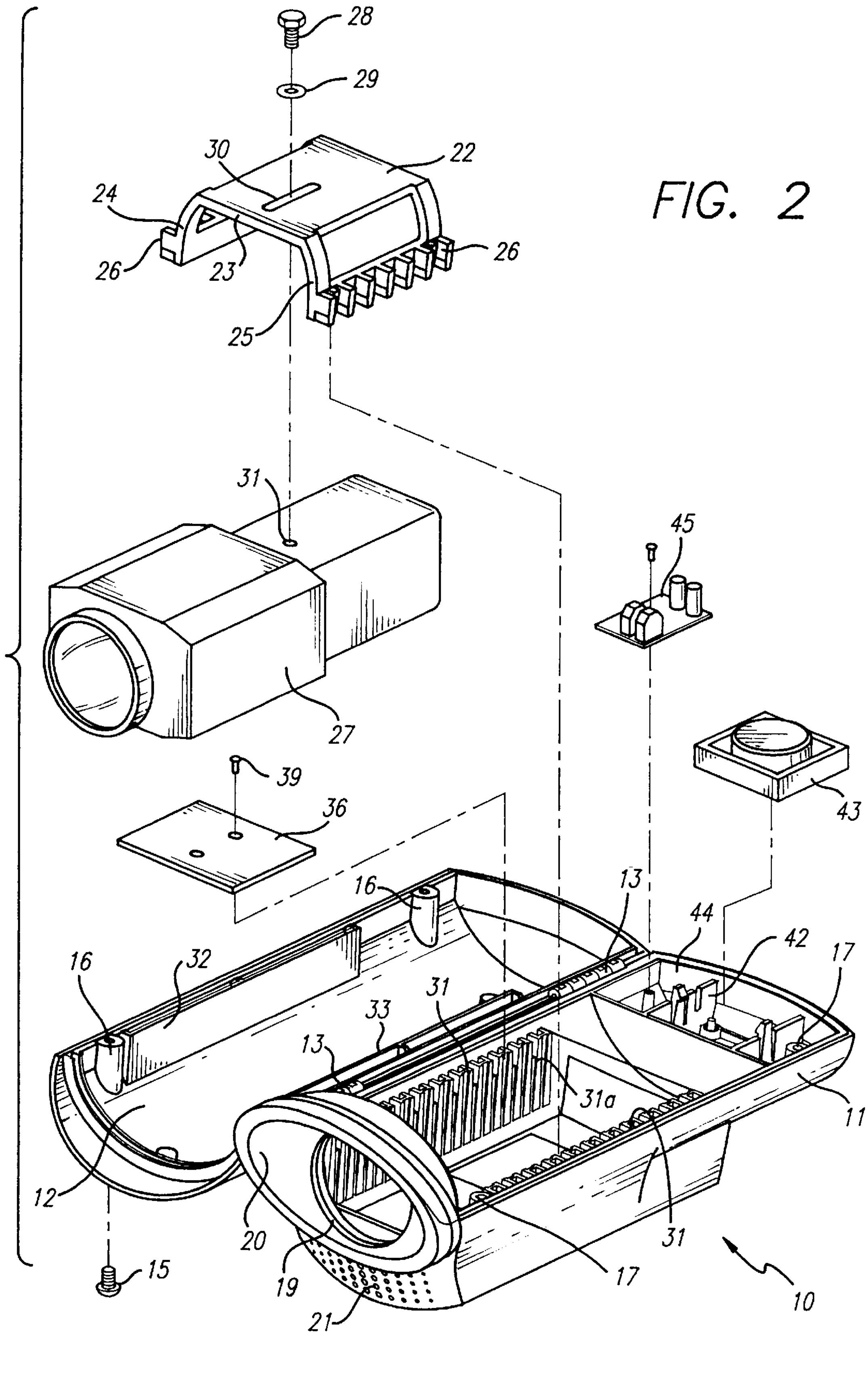
FIG. 2 is an exploded view of the camera housing of FIG. 1.
Figure 4:
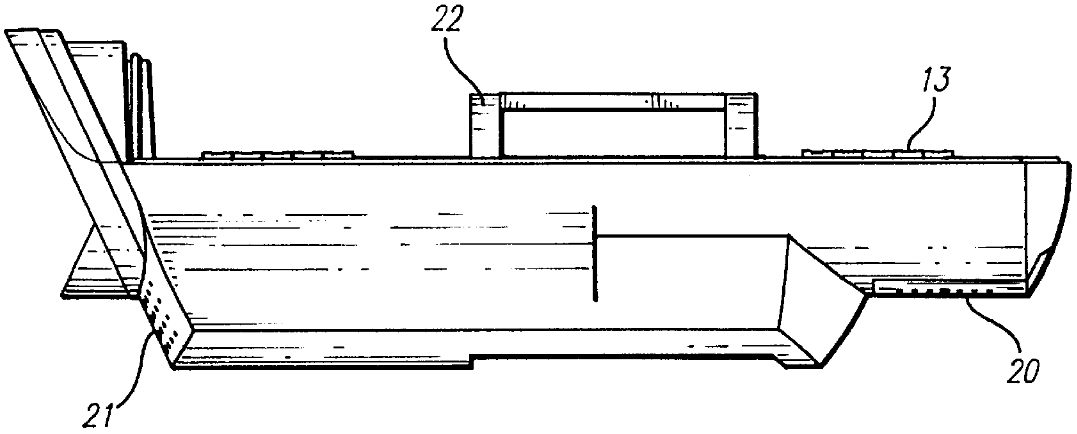
FIG. 4 is a side view of the housing of FIG. 1, in the open position.
Figure 5:
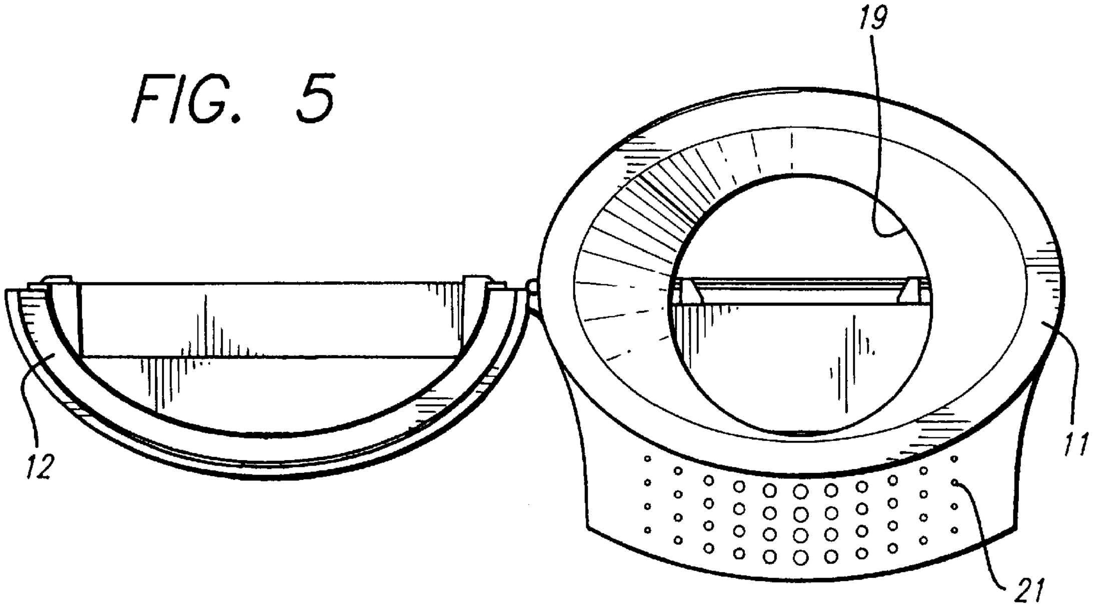
FIG. 5 is a front view of the housing of FIG. 1, in the open position.

The camera housing 10 of the invention is shown in the closed position in FIG. 1 and in the open position in FIGS. 2 and 3. The camera housing includes a bottom 11 and a top 12, with the bottom and top joined by a hinge 13. The hinge may be a single hinge or may be in two or more sections, and is shown in two sections in FIGS. 2 and 3. In the preferred embodiment, the top, bottom and hinge are formed as a single molding. The top may be held in the closed position by two screws 15 positioned in openings in bosses 16 molded in the top and passing into openings molded in bosses 17 in the bottom. For improved sealing of the housing when in the closed position, the mating surfaces of the top and bottom have interengaging tortuous faces. When the housing is in the open position, the inside of the top can serve as a tool bed for installer convenience.

Bosses 18 are molded in the interior of the top 12 for use when it is desired to provide a light shield or sun shield or hood over the housing. When intended for use with such a shield, holes are drilled through the bosses 18 for receiving the screws which attach the shield above the top.

An opening 19 is provided in the front end of the bottom for viewing by the lens of the camera.

Preferably the front end or nose of the bottom has an overhang serving as a sun shield. A nose piece 20 may be removable for ease of lens replacement. A lip 21 may be provided at the nose to guide rain runoff.

The camera housing includes a camera clamp 22 having a body 23 and opposed wings 24, 25. A plurality of projecting fingers 26 are provided at the end of each of the wings. The clamp is designed for attachment to a camera 27, with the body overlying at least a portion of the camera and being attached by a screw 28 and washer 29 passing through a slot 30 in the clamp and screwing into a threaded opening 31 of the camera.

The housing bottom has opposing side walls 29, 30, with each side wall having inwardly projecting fingers 31.

The fingers of the camera clamp are designed to slide in the spaces between the fingers of the housing bottom. The camera with the camera clamp attached is placed in the housing bottom with the fingers sliding in the spaces between the fingers. With this construction, the front and rear position of the camera in the camera housing is readily adjusted by lifting the camera and camera clamp upward, moving the camera with clamp toward the front or toward the rear to the desired position, and replacing the camera and clamp in the housing bottom. Preferably, the camera clamp will have a smaller number of the fingers while the housing bottom has a larger number of the corresponding spaces, providing a maximum front-rear range of movement for the camera.

In the preferred configuration, ribs 32, 33 are provided in the housing top projecting inward from the side walls of the housing top. The ribs, the fingers and the spaces for the fingers are dimensioned so that when the housing top is moved from the open position of FIGS. 2 and 3 to the closed position of FIG. 1, the ribs come to rest against the tops of the fingers of the camera clamp, holding the camera clamp with camera in place in the closed housing. If the installer wishes to change the location of the camera within the housing, the housing top is swung from the closed position to the open position, the camera and camera clamp are lifted up out of the housing bottom and moved to the desired new position and then placed back into the housing bottom. Then the housing top is swung over to the closed position and screwed in place.

As best seen in FIG. 2, the spaces between the fingers 31 of the housing bottom terminate at ribs 31*a*, to limit the downward movement of the camera clamp into the housing bottom to provide a positioning for the camera to align the camera lens with the opening in the camera housing.

In the preferred embodiment, a stiffener plate 36 is positioned in a recess 37 in the housing bottom, and is attached to a mounting bracket 38 on the exterior of the bottom by fasteners 39.

A cavity 42 is provided in the housing bottom for receiving a fan unit 43 for circulating air in the housing. Another cavity 44 is provided in the housing bottom for receiving a circuit board 45, which provides control circuitry for the fan, when used, and for a heater, when used.

One or more openings 47 may be provided in the housing bottom for receiving electrical cable connectors for the camera cable, as desired.

We claim:

1. A camera housing of generally rectangular shape with sides and ends and having a housing bottom and a housing top, with said top hinged to said bottom along one of said sides of said housing for pivoting between a housing open position for installing and removing a camera, and a housing closed position for holding the camera in place in said housing; and a camera clamp for attaching to the camera, said clamp having a body for overlying the camera and opposed wings projecting laterally from the camera, each of said wings having outwardly projecting fingers with spaces therebetween;

said housing bottom having opposing side walls defining a camera receiving section, each of said walls having laterally inwardly projecting fingers with spaces therebetween for engaging said camera clamp outwardly projecting fingers for positioning said camera clamp and camera in said housing.

2. A camera housing as defined in claim 1 wherein said housing top has opposing side walls with inner side ribs parallel to said housing top side walls and positioned to overly said housing bottom inwardly projecting fingers and spaces when said housing top is in said housing closed position.

3. A camera housing as defined in claim 2 wherein there are more of said housing bottom fingers and spaces than there are of said camera clamp fingers and spaces thereby providing a plurality of locations for positioning said clamp and camera in said housing bottom.

4. A camera housing as defined in claim 3 wherein said housing bottom has an inner bottom surface and an outer bottom surface, and including:

a stiffener plate and a mounting bracket, with said stiffener plate positioned on said inner bottom surface and with said mounting bracket positioned on said outer bottom surface, with said stiffener plate and mounting bracket joined together through said housing bottom.

5. A camera housing as defined in claim 4 including a fan unit mounted in said housing bottom.

6. A camera housing as defined in claim 5 including a heater unit mounted in said housing bottom.

7. A camera housing as defined in claim 6 including a control unit for said fan unit and said heater unit mounted in said housing bottom adjacent said fan unit.

8. A camera housing as defined in claim 7 wherein said housing bottom and said housing top are formed as a single molded unit with an integral hinge.

9. A camera housing of generally rectangular shape with sides and ends and having a housing bottom and a housing top, with said housing bottom and said housing top formed as a single molded unit with an integral hinge, with said top hinged to said bottom along one of said sides of said housing for pivoting between a housing open position for installing and removing a camera, and a housing closed position for holding the camera in place in said housing; and a camera clamp for attaching to the camera, said clamp having a body for overlying the camera and opposed wings projecting laterally from the camera, each of said wings having outwardly projecting fingers with spaces therebetween;

said housing bottom having opposing side walls defining a camera receiving section, each of said walls having laterally inwardly projecting fingers with spaces therebetween for engaging said camera clamp outwardly projecting fingers for positioning said camera clamp and camera in said housing;

said housing top having opposing side walls with inner side ribs parallel to said housing top side walls and positioned to overly said housing bottom inwardly projecting fingers and spaces when said housing top is in said housing closed position.

* * * * *